US008810512B2

(12) United States Patent
Andersson et al.

(10) Patent No.: US 8,810,512 B2
(45) Date of Patent: Aug. 19, 2014

(54) METHODS OF LAUNCHING APPLICATIONS RESPONSIVE TO DEVICE ORIENTATION AND RELATED ELECTRONIC DEVICES

(75) Inventors: Ola Andersson, Spånga (SE); Curt Collinsworth, Helsinki (FI); Johan Svedberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 438 days.

(21) Appl. No.: 12/971,954

(22) Filed: Dec. 17, 2010

(65) Prior Publication Data
US 2012/0050161 A1 Mar. 1, 2012

Related U.S. Application Data

(60) Provisional application No. 61/378,151, filed on Aug. 30, 2010.

(51) Int. Cl.
*G06F 3/033* (2013.01)
*G06F 1/16* (2006.01)

(52) U.S. Cl.
CPC ...... *G06F 1/1694* (2013.01); *G06F 2200/1637* (2013.01); *G06F 1/1626* (2013.01)
USPC ........................................................ 345/158

(58) Field of Classification Search
CPC .................................................. G06F 1/1626
USPC .......................... 345/156, 158, 173, 649, 656
See application file for complete search history.

(56) References Cited

U.S. PATENT DOCUMENTS

| 5,900,909 | A | 5/1999 | Parulski |
| 5,933,527 | A | 8/1999 | Ishikawa |
| 7,724,296 | B2 | 5/2010 | Lonn |
| 2003/0016883 | A1 | 1/2003 | Baron |
| 2004/0017506 | A1 | 1/2004 | Livingston |
| 2005/0044510 | A1 | 2/2005 | Yi |
| 2006/0222264 | A1 | 10/2006 | Guitarte Perez et al. |
| 2007/0004451 | A1* | 1/2007 | Anderson ................ 455/556.1 |
| 2008/0239131 | A1 | 10/2008 | Thorn |
| 2009/0225026 | A1 | 9/2009 | Sheba |
| 2010/0066763 | A1* | 3/2010 | MacDougall et al. ........ 345/656 |

(Continued)

FOREIGN PATENT DOCUMENTS

| EP | 0 884 905 A2 | 12/1998 |
| EP | 0 884 905 A3 | 12/1998 |

(Continued)

OTHER PUBLICATIONS

International Search Report and Written Opinion of the International Searching Authority corresponding to International Application No. PCT/SE2010/051411; Date of Mailing: May 10, 2011; 9 pages.
International Preliminary Report on Patentability Corresponding to International Application No. PCT/SE2010/051411; Date of Mailing: Oct. 9, 2012; 8 Pages.

(Continued)

*Primary Examiner* — Pegeman Karimi
(74) *Attorney, Agent, or Firm* — Myers Bigel Sibley & Sajovec, P.A.

(57) ABSTRACT

A method of operating an electronic device may include providing first graphic output of a first application on a display. Responsive to detecting a change in orientation of the electronic device, providing second graphic output of a second application may be automatically provided on the display. Related devices are also discussed.

16 Claims, 5 Drawing Sheets

(56) References Cited

U.S. PATENT DOCUMENTS

| | | | |
|---|---|---|---|
| 2010/0087230 A1* | 4/2010 | Peh et al. | 455/566 |
| 2010/0095251 A1 | 4/2010 | Dunko | |
| 2010/0238109 A1* | 9/2010 | Cook et al. | 345/156 |
| 2010/0289756 A1* | 11/2010 | Anzures et al. | 345/173 |

FOREIGN PATENT DOCUMENTS

| | | |
|---|---|---|
| FR | 2 861 524 | 4/2005 |
| WO | WO 01/31893 A1 | 5/2001 |
| WO | WO 02/37179 A2 | 5/2002 |
| WO | WO 02/37179 A3 | 5/2002 |
| WO | WO 2006/094308 A2 | 9/2006 |
| WO | WO 2008/027610 A1 | 3/2008 |

OTHER PUBLICATIONS

Response to the Notification from the International Preliminary Examination Authority, International Application No. PCT/SE2010/051411, Filed Sep. 27, 2012.

International Search Report corresponding to PCT/EP2007/058865, mailed Dec. 19, 2007.

A.W. Senior "Face and Feature Finding for a Face Recognition System" in proceedings of Audio and Video based Biometric Person Authentication '99 pp. 154-159, Washington D.C. USA, Mar. 22-24, 1999.

Rocio Diaz de Leon, Luis Enrique Sucar "Human Silhouette Recognition with Fourier Descriptors," icpr. p. 3713, 15th International Conference on Pattern Recognition (ICPR '00), vol. 3, 2000.

* cited by examiner

METHODS OF LAUNCHING APPLICATIONS RESPONSIVE TO DEVICE ORIENTATION AND RELATED ELECTRONIC DEVICES

RELATED APPLICATION

The present application claims the benefit of priority of U.S. Provisional Application No. 61/378,151 entitled "Methods Of Launching Application Responsive To Device Orientation And Related Electronic Devices" and filed Aug. 30, 2010, the disclosure of which is hereby incorporated herein in its entirety by reference.

BACKGROUND

In some mobile electronic devices (such as tablet computers and/or smartphones), a display may be used in different physical orientations to view, for example, text, still visual images (e.g., photographs), TV broadcasts, videos, etc. Moreover, different applications may render visual output on the display in different orientations, such as "portrait" and "landscape" orientations. More particularly, a "portrait" orientation provides a height of the displayed data representation (also referred to as graphic output) that is greater than its width, while a "landscape" orientation provides a width of the displayed data representation that is greater than its height. For example, a video or TV broadcast application may provide graphic output in a "landscape" orientation with width greater than height, while a text application may provide graphic output in a "portrait" mode with height greater than width.

A user may be required to manually select/reselect between different applications and/or to manually configure/reconfigure graphic output controls to select the appropriate graphic output orientation. After manually selecting/reselecting the application and/or configuring/reconfiguring graphic output controls, the user may then need to rotate the mobile electronic device to the appropriate orientation for the selected application. Accordingly, there continues to exist a need in the art for methods of operating electronic devices to provide improved transition between different applications generating graphic output for different display orientations.

SUMMARY

According to some embodiments, a method of operating an electronic device may include providing first graphic output of a first application on a display, and detecting a change in orientation of the electronic device. Responsive to detecting the change in orientation, second graphic output of a second application may be provided on the display. Accordingly, a user may switch back and forth between different applications providing graphic output in different orientations by merely rotating the phone to the orientation appropriate for the selected application (without requiring user input through user interface inputs). User action of merely rotating the electronic device may thus orient the device to view graphic output from the new application while also initiating the new application without requiring the user to manually reconfigure a graphics controller or to manually select the new application. For example, the second application may be automatically launched and graphic output of the second application may be automatically provided on the display without requiring user input through user interface inputs.

Providing the first graphic output may include providing the first graphic output of the first application on the display according to a first mode with the graphic output of the first application aligned with a first axis of the display, and providing the second graphic output may include providing the second graphic output of the second application on the display according to a second mode with the graphic output of the second application aligned with a second axis of the display different than the first axis. The first and second axis of the display, for example, may be offset by 90 degrees.

The first application may be a master application, and the second application may be an auxiliary application integrated with the master application. The first application may be a video application, and the second application may be a browser application, with the video and browser applications being integrated. The first mode may be a landscape mode, and the second mode may be a portrait mode.

The graphic output of the first application may be paused responsive to detecting the change in orientation, so that the graphic output of the first application may resume at the pause when operation reverts back to the first application. After providing the second graphic output of the second application on the display, for example, a second change in orientation of the electronic device may be detected, and responsive to detecting the second change in orientation, providing the first graphic output of the first application on the display may resume beginning where the first graphic output was paused. For example, the first graphic output of the first application may automatically resume on the display beginning where the first graphic output was paused responsive to detecting the second change in orientation.

After providing the second graphic output on the display, a second change in orientation of the electronic device may be detected, and third graphic output of a third application may be provided on the display responsive to detecting the second change in orientation. For example, the third graphic output of the third application may be automatically provided on the display responsive to detecting the second change in orientation without requiring user input through user interface inputs. Providing the first graphic output may include providing the first graphic output of the first application on the display according to a first mode with the graphic output of the first application aligned with a first axis of the display. Providing the second graphic output may include providing the second graphic output of the second application on the display according to a second mode with the graphic output of the second application aligned with a second axis of the display different than the first axis. Providing the third graphic output may include providing the third graphic output of the third application on the display according to a third mode with the graphic output of the third application oriented 180 degrees relative to the first graphic output of the first application and/or the second graphic output of the second application.

Providing the first graphic output may include launching the first application and providing the first graphic output of the first application on the display. Providing the second graphic output may include automatically launching the second application and automatically providing the second graphic output of the second application on the display without requiring user input through user interface inputs.

According to some other embodiments, an electronic device may include a display configured to provide graphic output, an orientation sensor configured to sense a physical orientation of the electronic device, and a processor coupled to the display and coupled to the orientation sensor. The processor may be configured to provide first graphic output of a first application on the display, to detect a change in orientation of the electronic device responsive to a signal from the orientation sensor, and to provide second graphic output of a second application on the display responsive to detecting the change in orientation. For example, the processor may automatically launch the second application to automatically provide graphic output of the second application on the display without requiring user input through user interface inputs.

The processor may be configured to provide the first graphic output of the first application on the display according to a first mode with the graphic output of the first application aligned with a first axis of the display, and to provide the second graphic output of the second application on the display according to a second mode with the graphic output of the second application aligned with a second axis of the display different than the first axis. The first and second axis of the display, for example, may be offset by 90 degrees.

The first application may be a master application, and the second application may be an auxiliary application integrated with the master application. The first application may be a video application, and the second application may be a browser application, with the video and browser applications being integrated. The first mode may be a landscape mode, and the second mode may be a portrait mode. The processor may be further configured to pause the graphic output of the first application responsive to detecting the change in orientation. The processor may be further configured to detect a second change in orientation of the electronic device responsive to a signal from the orientation sensor after providing the second graphic output of the second application on the display, and to resume providing the first graphic output of the first application on the display beginning where the first graphic output was paused responsive to detecting the second change in orientation. For example, the processor may automatically resume providing the first graphic output of the first application on the display beginning where the first graphic output was paused responsive to detecting the second change in orientation without requiring user input through user interface inputs.

The processor may be further configured to detect a second change in orientation of the electronic device responsive to a signal from the orientation sensor after providing the second graphic output on the display, and to provide third graphic output of a third application on the display responsive to detecting the second change in orientation. For example, the processor may automatically launch the third application and may automatically provide the graphic output of the third application on the display responsive to detecting the second change in orientation without requiring user input through user interface inputs.

The processor may be configured to provide the first graphic output of the first application on the display according to a first mode with the graphic output of the first application aligned with a first axis of the display, to provide the second graphic output of the second application on the display according to a second mode with the graphic output of the second application aligned with a second axis of the display different than the first axis, and to provide the third graphic output of the third application on the display according to a third mode with the graphic output of the third application oriented 180 degrees relative to the first graphic output of the first application and/or the second graphic output of the second application.

The processor may be configured to provide the first graphic output by launching the first application and providing the first graphic output of the first application on the display, and the processor may be configured to provide the second graphic output by automatically launching the second application and automatically providing the second graphic output of the second application on the display.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In an electronic device (e.g., a mobile radiotelephone, a smartphone, a tablet personal computer, etc.) including a rectangular display (e.g., a rectangular LCD display, a rectangular touch screen display, etc.), graphic output/content may be oriented on the display in either a landscape mode (with width greater than height) or a portrait mode (with height greater than width). Moreover, the electronic device may automatically select the display mode responsive to an orientation of the device relative to the ground and/or floor.

For example, the electronic device may include one or more accelerometers configured to detect a direction of a gravitational pull on the electronic device. A processor may be coupled to the accelerometer(s) and to the display, and the processor may be configured to determine an orientation of the electronic device relative to the ground and/or floor. Accordingly, the processor may be configured to render an image on the display in the landscape mode when the electronic device is oriented with the widest dimension of the display substantially horizontal (relative to the ground/floor) and with the narrowest dimension of the display substantially vertical (relative to the ground/floor), and the processor may be configured to render the image on the display in the portrait mode when the electronic device is oriented with the narrowest dimension of the display substantially horizontal (relative to the ground/floor) and with the widest dimension substantially vertical (relative to the ground/floor).

Figure 1:
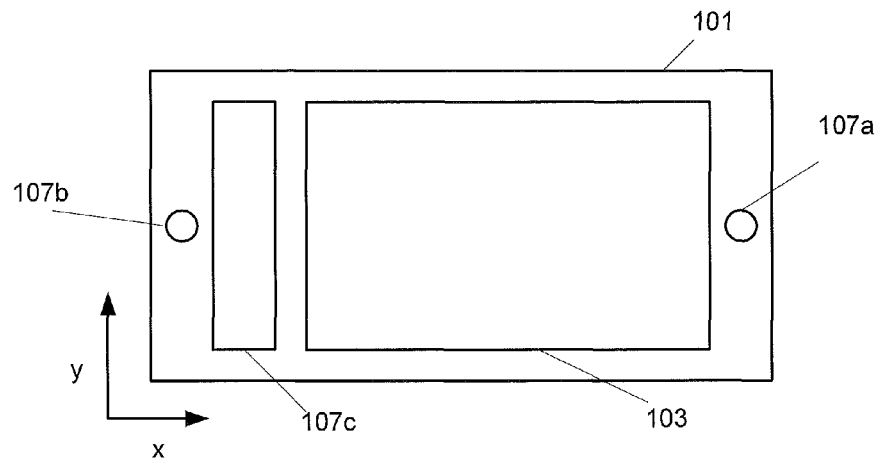
FIG. 1 is a plan view of an electronic device according to some embodiments.
Figure 2:
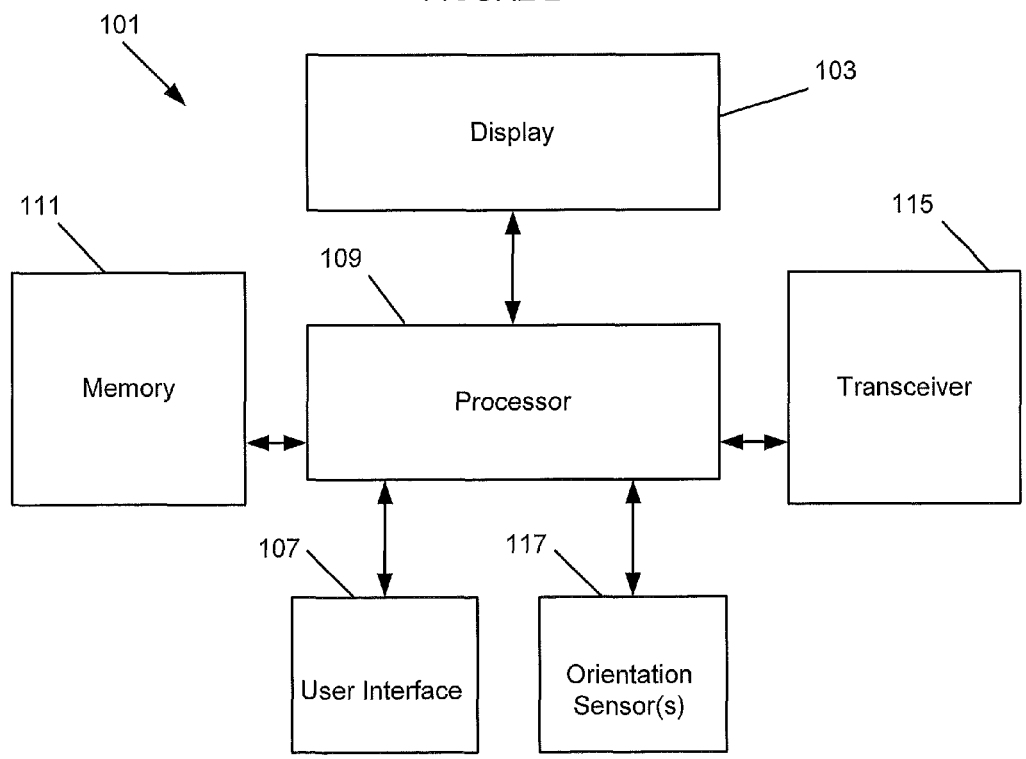
FIG. 2 is a block diagram of the electronic device of FIG. 1 according to some embodiments.

According to some embodiments shown in the plan view of FIG. 1 and the block diagram of FIG. 2, a mobile electronic device 101 (such as a tablet personal computer or tablet PC) may include a display 103 (e.g., a liquid crystal display or LCD, a touch sensitive display, etc.). Electronic device 101 may also include user interface 107 including user interface elements such as speaker 107a, microphone 107b, touch input 107c, etc. Touch input 107c, for example, may include a keypad, a touch pad, a dial, a joystick, a touch sensitive surface of display 103, etc. While particular user interface elements are illustrated by way of example, illustrated interface elements may be omitted and/or other user interface elements may be included. For example, speaker 107a and/or microphone 107b may be omitted if radiotelephone functionality is not provided by mobile electronic device 101.

In addition, electronic device 101 may include orientation sensor(s) 117 coupled to processor, and orientation sensor(s)

117 (e.g., gravitational sensors) may be configured to detect a physical orientation of electronic device 101 (and display 103 thereof) relative to a ground/floor plane. For example, three gravitational sensors (for the x-axis, y-axis, and z-axis of electronic device 101) may be configured to detect an orientation of electronic device 101 in three dimensions relative to gravitational forces thereon (perpendicular to a ground/floor plane). The x-axis and y-axis of electronic device 101 (shown in FIG. 1) may define axes of the surface of FIG. 1 (including display 103), and the z-axis of electronic device 101 may define an axis perpendicular with respect to the surface of FIG. 1. By way of example, orientation sensor(s) 117 may include one or more of a mercury switch(es), an accelerometer(s) (such as a microelectromechanical accelerometer(s)), a gyroscope(s), a magnetometer(s), etc.

As shown in FIG. 2, processor 109 may be coupled to each of display 103, user interface 107, memory 111, wireless transceiver 115 (e.g., cellular radiotelephone transceiver, Bluetooth transceiver, WiFi transceiver, etc.), and orientation sensor(s) 117. Elements of FIGS. 1 and 2, however, may be omitted if not required for functionality of electronic device 101. For example, wireless transceiver 115 may be omitted if wireless communications are not supported by electronic device 101. Processor 109 may be configured to control functionality of electronic device 101 using instructions/information stored in memory 111 and/or received through transceiver 115 to provide one or more functionalities such as mobile telephony, mobile video telephony, internet browsing, text messaging, e-mail, document generation/display, video/audio reproduction/recording, etc.

Figure 3A:
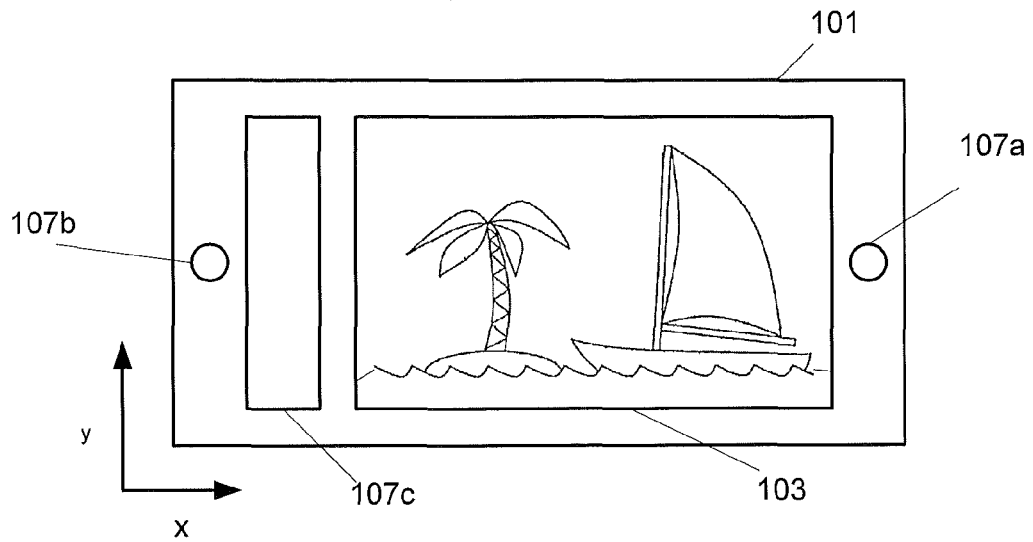
FIGS. 3A, 3B, and 3C are plan views of the electronic device of FIGS. 1 and 2 illustrating operations of the electronic device responsive to rotation thereof according to some embodiments.
Figure 3B:
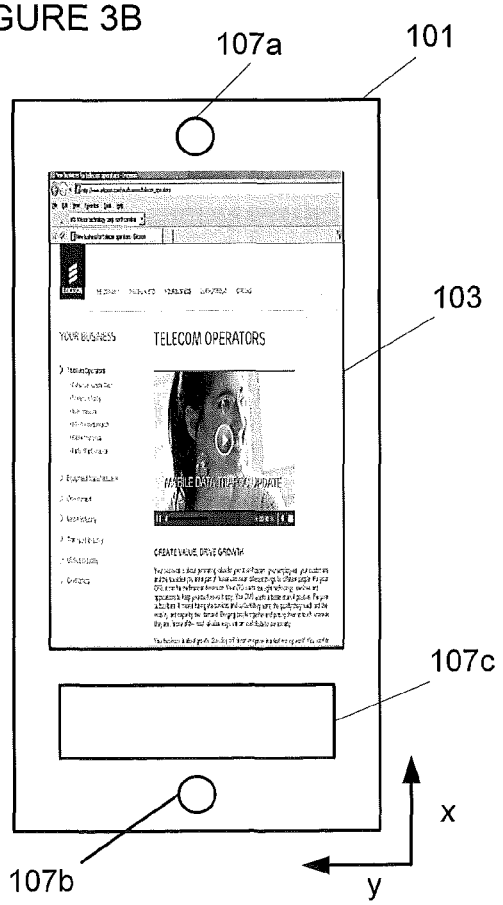
Figure 3C:
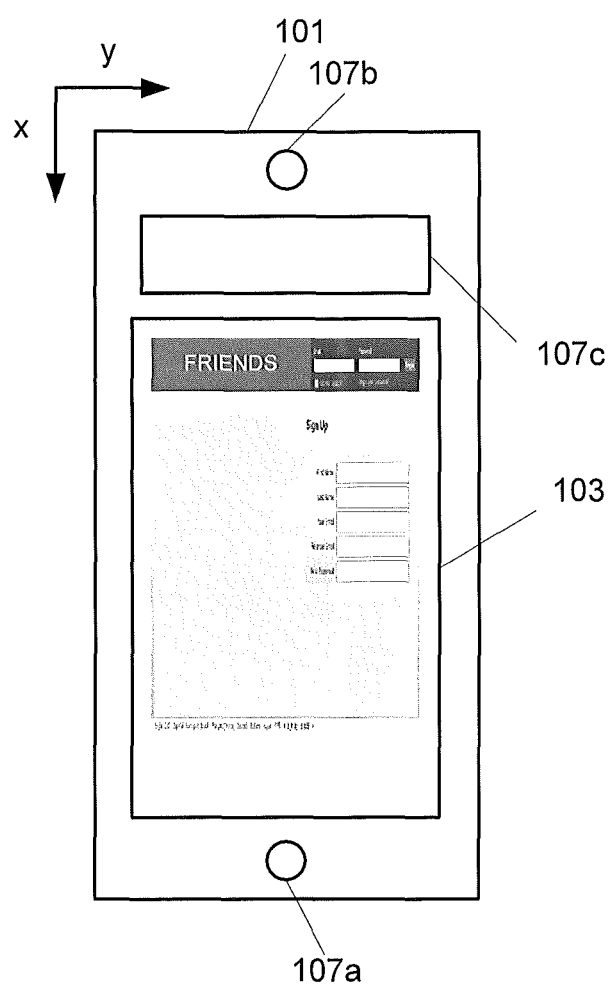

Mobile electronic device 101 (e.g., a mobile radiotelephone, a smartphone, a tablet personal computer, etc.) may thus include an orientations sensor(s) 117 (e.g., an accelerometer(s)) and the orientation sensor(s) 117 may be used to sense an orientation of the electronic device 101. More particularly, orientation sensor(s) 117 may be used to sense a physical orientation of electronic device 101 and display 103 thereof, and responsive to the sensed physical orientation, processor 109 may automatically determine whether to render graphic output/content on display 103 in a landscape or portrait mode. For example, when electronic device 101 is held with display 103 in a landscape orientation (e.g., with a longest dimension of the display substantially horizontal with respect to the ground/floor and with a shortest dimension substantially vertical with respect to ground) as shown in FIG. 3A, graphic output/content may be automatically rendered on the display in landscape mode with horizontal elements of the graphic output/content oriented across the longest dimension of the display. When the electronic device is held with the display in a portrait orientation (e.g., with a longest dimension of the display substantially vertical with respect to the ground/floor and with the shortest dimension substantially horizontal with respect to ground) as shown in FIGS. 3B and 3C, graphic output/content may be rendered on display 103 in portrait mode with horizontal elements of the graphic output/content oriented across the shortest dimension of display 103. For device applications that have different views for landscape and portrait modes, processor 109 may dynamically alter graphic output/content rendered on the display between landscape and portrait modes when the user rotates electronic device 101.

Some electronic devices may be designed to be primarily used in one orientation only (e.g., in landscape mode only or in portrait mode only) and orientation specific views may not be provided. A traditional television (TV), for example, is designed to be used in landscape mode only, because graphical content for television is provided with a horizontal dimension that is greater than a vertical dimension. Even with television applications for portable electronic devices (e.g., the Ericsson IPTV Remote Control), the application is designed to render the graphical content in landscape mode only to accommodate the television format for graphical content.

When an application that is designed to render graphical output in only a single display mode (e.g., a television application that is designed for landscape mode only) is blended with another application that is more suitable for another display mode (e.g., portrait mode), however, a suitable user experience may be difficult to provide while also providing the desired display modes for the different blended applications.

A video application may include a blended/integrated browser application, for example, with the video application designed to render graphic output/content in landscape mode and with the blended/integrated browser application designed to render graphic output/content in portrait mode. In such a blended application, the browser application may be initiated from the video application. A browser button, for example, may be provided in the video application graphical output which is rendered on the display in landscape mode, and the browser button may be clicked/selected to launch the browser application with graphical output rendered on the display in portrait mode. With this arrangement, however, the user may be forced into a two-step process to launch the auxiliary browser application from the master video application in the blended/integrated service. The user, for example, may be required to click the browser button and then turn the display, and/or the user may initially see the browser application graphical output in the wrong orientation.

According to some embodiments, processor 109 may be configured to switch between two blended/integrated applications/services designed for different display orientations only by turning electronic device 101. In a blended/integrated application/service scenario where two applications/services are blended/integrated into a common experience, one application may be a master application (e.g., the application that is initially launched), and the other application may be an auxiliary application. For example, a master application (e.g., a video or television application) may be configured to render graphical content in landscape mode only, and an auxiliary application (e.g., a browser application) may be configured to render graphical output in portrait mode only. The master application may be launched and running on processor 109 in landscape mode as shown in FIG. 3A, and while running, the master application may monitor/listen for a change in physical orientation that may be detected using orientation sensor(s) 117. When the master application (providing graphic output/content in landscape mode) running on processor 109 detects the change in physical orientation of display 103 (e.g., that display 103 has been rotated 90 degrees from a landscape mode viewing orientation to a portrait mode viewing orientation), the master application may automatically launch the auxiliary application in portrait mode without requiring other user input as shown in FIG. 3B. Stated in other words, the master application running on processor 109 may automatically switch from the master application (providing landscape mode graphical output) to the auxiliary application (providing portrait mode graphical output) responsive to orientation sensor(s) 117 output without any responsiveness to user input via user interface 107.

When operation is automatically changed from the master application (displayed in landscape mode as shown in FIG. 3A) to the auxiliary application (displayed in portrait mode as shown in FIG. 3B) responsive to rotating the display from the landscape orientation to the portrait orientation, graphical output of the auxiliary application is given focus and graphical output of the master application may be taken out of focus. In addition, the master application may take additional action (such as automatically pausing video/television streaming without any responsiveness to user input via user interface 107) when the auxiliary application is launched.

After launching the auxiliary application, the master application running on processor 109 may continue to listen/monitor for a change in physical orientation back to the landscape orientation while the auxiliary application is in focus. When such a change in physical orientation is detected by processor 109 using orientation sensor(s) 117, processor 109 may automatically close/hide the auxiliary application, and the master application may automatically resume operation with graphical output provided in the landscape mode (without any responsiveness to user input via user interface 107). Graphical output from the master application may thus be given focus. If the master application is automatically paused when the auxiliary application is launched, the master application may automatically resume playing when master application operations resume (without any responsiveness to user input via user interface 107). Video/television playing/streaming may be automatically paused at a pause when the auxiliary application is launched, and video/television playing/streaming may be automatically resumed beginning at the pause when operation reverts to the master application so that no video/television content is missed by the user while using the auxiliary application.

According to some embodiments, a user may more conveniently switch between two blended/integrated services/applications that are designed for different screen orientations. The user, for example, may watch video/television using a master video/television application on portable electronic device 101 in landscape mode as shown in FIG. 3A. When the user wants to check something on the Internet using a blended/integrated auxiliary browser application, the user may rotate the device 90 degrees from the landscape orientation to the portrait orientation to automatically pause the video/television streaming/output and to automatically launch the auxiliary browser application providing graphical output in the portrait mode (without any responsiveness to user input via user interface 107) as shown in FIG. 3B. When finished with the auxiliary browser application, the user rotates electronic device 101 ninety degrees back to the landscape orientation to automatically close/hide the browser application and to automatically resume playing the video/television content from the point that it was closed (without any responsiveness to user input via user interface 107) as shown in FIG. 3A.

While one auxiliary application is discussed by way of example, one, two, or even three auxiliary applications may be provided according to some embodiments. A master video/television application (configured to provide graphical output in landscape mode), for example, may include a first auxiliary browser application (configured to provide graphical output in a first portrait mode) as discussed above with respect to FIG. 3B and a second auxiliary social media application (configured to provide graphical output in a second portrait mode oriented 180 degrees relative to the first portrait mode) as shown in FIG. 3C. When viewing video/television content using the master video/television application as shown in FIG. 3A, the user may rotate the electronic device 90 degrees counter clockwise to launch the first auxiliary browser application as discussed above with respect to FIG. 3B, or the user may rotate the electronic device 90 degrees clockwise to launch the second auxiliary social media application as shown in FIG. 3C. From either of the auxiliary applications, the user may rotate electronic device 101 back to the landscape orientation to resume the master application as shown in FIG. 3A.

Figure 4A:
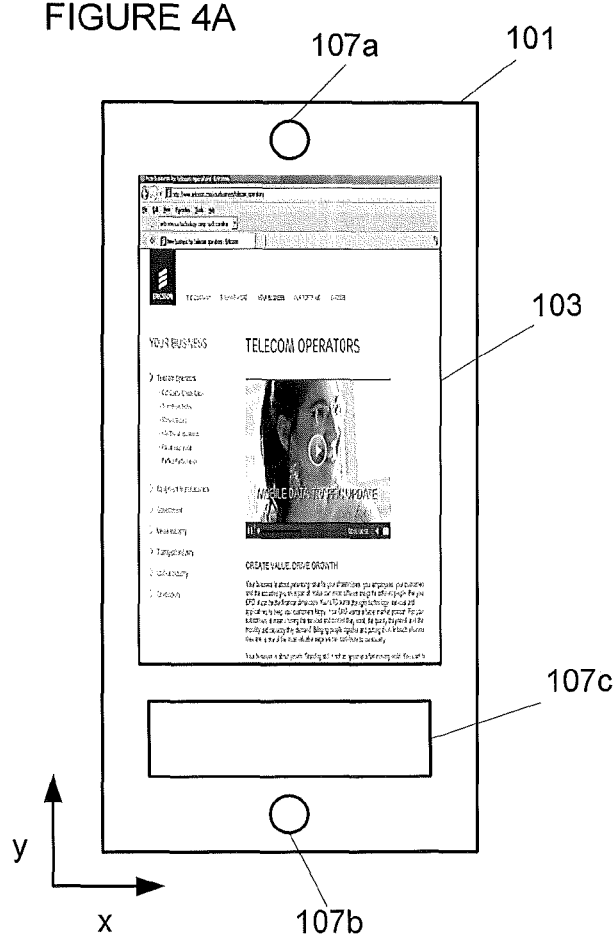
FIGS. 4A and 4B are plan views of the electronic device of FIGS. 1 and 2 illustrating operations of the electronic device responsive to rotation thereof according to some embodiments.
Figure 4B:
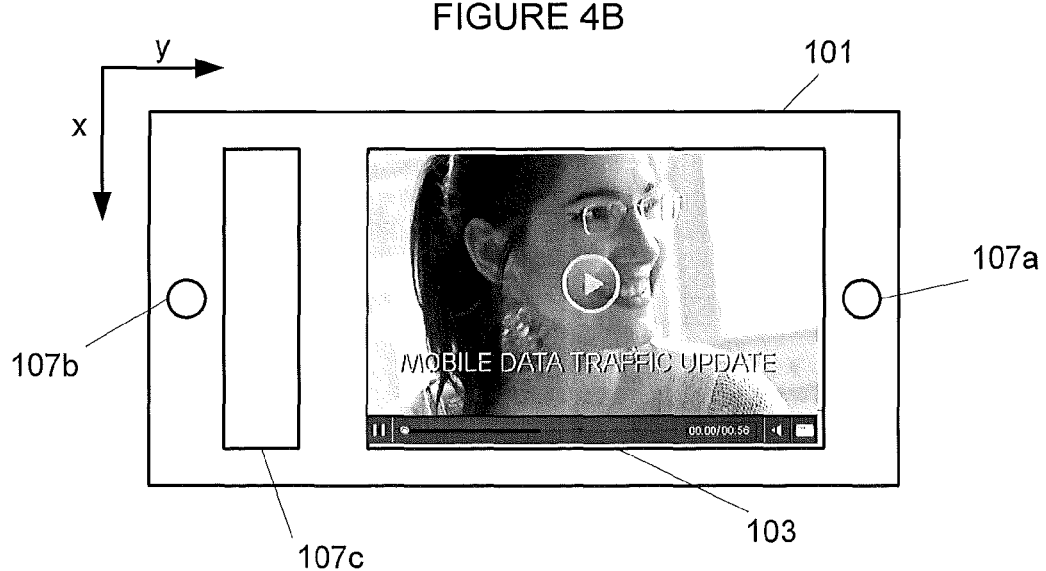

According to other embodiments of the present application, a master application may be a master browser application as shown in FIG. 4A configured to provide graphic output/content in portrait mode, and an auxiliary application may be an auxiliary video application as shown in FIG. 4B configured to provide graphic output/content in landscape mode. The axes of electronic device 101 have been changed relative to those of FIGS. 1 and 3A-C to reflect the different graphic output/content orientation of the master application. As shown in FIG. 4A, processor 109 may be configured to run the master browser application providing graphic output/content in portrait mode, and a video link may be provided in the page being displayed by the master browser application. Responsive to detecting rotation of electronic device 101 to the landscape orientation with a video link present in the page being displayed by the master browser application, processor 109 may be configured to automatically launch the video with video output being provided in landscape mode (without any responsiveness to user input via user interface 107) as shown in FIG. 4B.

Figure 5:
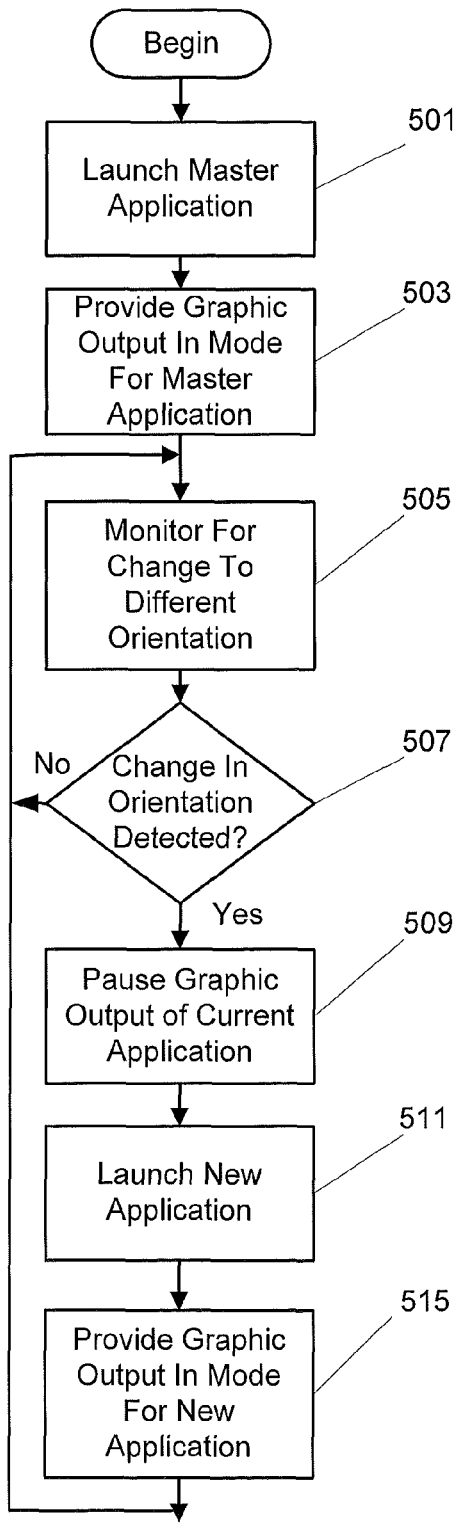
FIG. 5 is a flow chart illustrating operations of methods according to some embodiments.

FIG. 5 is a flow chart illustrating operations of processor 109 running a master application including one or more auxiliary applications according to some embodiments. Electronic device 101, for example may be a portable video device configured to launch and run a master video application at block 501 responsive to being turned on. Moreover, the master video application may be configured to provide graphic output/content on display 103 in a first mode (e.g., a landscape mode) at block 503 on display 103 as shown in FIG. 3A. With a master video application, processor 109 may be configured to stream video content stored in memory 111 and/or received through wireless transceiver 115 from a remote source such as a remote server. The master video application may allow user input through user interface 107 and/or through a touch sensitive surface of display 103 to navigate to different video sources/channels, to pause/play video, to control volume, etc. while displaying video.

While running the master application and providing graphic output therefrom, processor 109 may be configured to monitor for rotation of electronic device 101 to a different orientation at block 505. As long as the electronic device 101 is maintained in the orientation suitable for graphic output/content from the master application at block 507 (e.g., in the landscape orientation that is suitable for graphic output/content from a master video application as shown in FIG. 3A), processor 109 continues provide graphic output/content for the master application. Upon detecting rotation of electronic device 101 to a different orientation suitable for graphic output/content form an auxiliary application at block 507 (e.g., counter clockwise rotation to the portrait orientation that is suitable for graphic output/content from an auxiliary browser application as shown in FIG. 3B), processor 109 may automatically pause the master application at block 509 (without any responsiveness to user input via user interface 107), automatically change to the auxiliary application associated with the new orientation at block 511 (without any responsiveness to user input via user interface 107), and provide graphic output/content in a new mode (e.g., portrait mode) for the auxiliary application at block 515. While using the auxiliary application, processor 109 may monitor for rotation back to the original (or a different) orientation at blocks 505 and 507, and operations may be changed to back to the master application or a different auxiliary application upon detecting rotation to different orientations.

With a master video application, processor 109 may automatically pause the video output at block 509 when operation is changed to an auxiliary browser application so that video content is not missed while using the auxiliary browser application. Upon detecting rotation of electronic device 101 back to the orientation for the master video application at blocks 505 and 507, processor 109 may automatically resume playing the video output/content at the point where the video was previously paused (without any responsiveness to user input via user interface 107).

Operations of blocks 505 to 515 may be repeated any number of times depending on the user's rotation of electronic device 101. The user may thus hold electronic device 101 in the orientation of FIG. 3A to view video using a master video application with graphic output/content being provided in a first mode (e.g., landscape mode). Upon rotation of electronic device 90 degrees counter clockwise (from the first orientation) to the second orientation shown in FIG. 3B, operation of an auxiliary browser application may be launched with graphic output/content being provided in a second mode (e.g., portrait mode) that is offset from the first mode by 90 degrees. Upon rotation of electronic device 90 degrees clockwise (from the first orientation) to the third orientation shown in FIG. 3C, operation of an auxiliary social media application may be launched with graphic output/content being provided in a third mode (e.g., a second portrait mode that is rotated 180 degrees relative to the first portrait mode).

While one master and two auxiliary applications are discussed by way of example, a third auxiliary application may be associated with a fourth orientation of electronic device that is rotated 180 degrees relative to the first orientation associated with the master application. With a rectangular display 103, a master application may be associated with a first orientation of display 103, and up to three auxiliary applications may be associated with respective other orientations of display 103. In other words, each master/auxiliary application may be configured to be selected responsive to a unique physical orientation of display 103, and each master/auxiliary application may be configured to provide graphic output/content only in a format that is consistent with its respective physical orientation of display 103. Moreover, upon changing from master application to any auxiliary application, output of master application may be automatically paused (without any responsiveness to user input via user interface 107), and upon changing back to the master application, output of the master application may automatically resume from the pause (without any responsiveness to user input via user interface 107).

In FIGS. 3A to 3C and 4A to 4B, the z axis (perpendicular to a plane of display 103) of electronic device 101 may be maintained substantially parallel with respect to the floor/ground so that one of the x axis or the y axis may be substantially perpendicular with respect to ground as electronic device 101 is rotated substantially around the z axis to the different illustrated orientations. Accordingly, processor 109 may use input from orientation sensor(s) 117 to determine whether display 101 is held in an orientation that is most appropriate for landscape or portrait mode. As discussed above, graphic output of a current application may be paused and/or a new application may be launched automatically responsive to detecting a change in orientation of electronic device 101 without any responsiveness to user input via user interface 107. While electronic device 101 switches automatically between different applications and display orientations responsive to changes in device orientation without any responsiveness to user input via user interface 107, user input via interface 107 may be used to control operation of an application once it has been launched.

Various embodiments are described fully herein with reference to the accompanying figures, in which various embodiments are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and are described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification, there have been disclosed embodiments of the invention and, although specific terms are employed, they are used in a generic and descriptive sense only and not for purposes of limitation. Many variations and modifications can be made to the embodiments without substantially departing from the principles of the present invention. All such variations and modifications are intended to be included herein within the scope of the present invention.

What is claimed is:

1. A method of operating an electronic device, the method comprising:

providing first graphic output of a browser application on a display, wherein providing the first graphic output comprises launching the browser application, wherein the first graphic output of the browser application is provided on the display according to a first mode with the first graphic output of the browser application being aligned with a first axis of the display, and wherein a video application is integrated with the browser application by including a video link in the first graphic output of the browser application;

detecting a change in orientation of the electronic device while providing the first graphic output of the browser application including the video link; and responsive to detecting the change in orientation while providing the first graphic output of the browser application including the video link, automatically providing second graphic output of the video application associated with the video link on the display responsive to detecting the change in orientation without requiring user input through a user interface, wherein the second graphic output of the video application is provided on the display according to a second mode with the second graphic output of the video application aligned with a second axis of the display different than the first axis, wherein automatically providing the second graphic output comprises automatically launching the video application responsive to detecting the change in orientation without requiring user input through the user interface, and wherein automatically launching the video application comprises automatically switching from the browser application to the video application responsive to detecting rotation of the electronic device from the first axis to the second axis.

2. The method according to claim 1 wherein the first mode comprises a portrait mode and wherein the second mode comprises a landscape mode.

3. The method according to claim 1 further comprising:

after providing the second graphic output of the video application on the display, detecting a second change in orientation of the electronic device;

responsive to detecting the second change in orientation, automatically pausing the second graphic output of the video application responsive to detecting the change in orientation; and responsive to detecting the second change in orientation, resuming providing the first graphic output of the browser application on the display.

4. The method according to claim 3 further comprising:

after detecting the second change in orientation of the electronic device while providing the first graphic output of the browser application, detecting a third change in orientation of the electronic device; and responsive to detecting the third change in orientation while providing the first graphic output of the browser application, automatically resuming providing the second graphic output of the video application beginning where the second graphic output was paused.

5. The method according to claim 1 further comprising:
after providing the second graphic output on the display, detecting a second change in orientation of the electronic device; and
responsive to detecting the second change in orientation, providing third graphic output of a third application on the display.

6. The method according to claim 5 wherein providing the third graphic output comprises providing the third graphic output of the third application on the display according to a third mode with the graphic output of the third application oriented 180 degrees relative to the first graphic output of the browser application and or the second graphic output of the video application.

7. The method according to claim 1 further comprising:
after providing the second graphic output, detecting a second change in orientation of the electronic device;
responsive to detecting the second change in orientation, pausing the second graphic output of the video application;
responsive to detecting the second change in orientation, resuming providing the first graphic output of the browser application on the display;
after resuming providing the first graphic output of the browser application, detecting a third change in orientation of the electronic device; and
responsive to detecting the third change in orientation, resuming providing the second graphic output of the video application on the display beginning where the second graphic output was paused.

8. The electronic device according to claim 1 wherein the browser application is configured to provide Internet browsing.

9. An electronic device comprising:
a display configured to provide graphic output;
an orientation sensor configured to sense a physical orientation of the electronic device; and
a processor coupled to the display and coupled to the orientation sensor, wherein the processor is configured to provide first graphic output of a browser application by launching the browser application and providing the first graphic output of the browser application on the display, wherein the first graphic output of the browser application is provided on the display according to a first mode with the first graphic output of the browser application being aligned with a first axis of the display, and wherein a video application is integrated with the browser application by including a video link in the first graphic output of the browser application, wherein the processor is configured to detect a change in orientation of the electronic device responsive to a signal from the orientation sensor while providing the first graphic output of the browser application including the video link, and wherein the processor is configured to automatically provide second graphic output of the video application associated with the video link by automatically launching the video application responsive to detecting the change in orientation without requiring user input through a user interface and automatically providing the second graphic output of the video application on the display responsive to detecting the change in orientation without requiring user input through the user interface while providing the first graphic output of the browser application including the video link, wherein the second graphic output of the video application is provided on the display according to a second mode with the second graphic output of the video application aligned with a second axis of the display different than the first axis, and wherein automatically launching the video application comprises automatically switching from the browser application to the video application responsive to detecting rotation of the electronic device from the first axis to the second axis.

10. The electronic device according to claim 9 wherein the first mode comprises a portrait mode and wherein the second mode comprises a landscape mode.

11. The electronic device according to claim 9 wherein the processor is further configured to pause the first graphic output of the browser application responsive to detecting, the change in orientation.

12. The electronic device according to claim 11 wherein the processor is further configured to detect a second change in orientation of the electronic device responsive to a signal from the orientation sensor after providing the second graphic output of the video application on the display, and to resume providing the first graphic output of the browser application on the display beginning where the first graphic output was paused responsive to detecting the second change in orientation.

13. The electronic device according to claim 9 wherein the processor is further configured to detect a second change in orientation of the electronic device responsive to a signal from the orientation sensor after providing the second graphic output on the display, and to provide third graphic output of a third application on the display responsive to detecting the second change in orientation.

14. The electronic device according to claim 13 wherein the processor is configured to provide the third graphic output of the third application on the display according to a third mode with the graphic output of the third application oriented 180 degrees relative to the first graphic output of the browser application and/or the second graphic output of the video application.

15. The electronic device according to claim 9 wherein the processor is configured to detect a second change in orientation of the electronic device after providing the second graphic output, to pause the second graphic output of the video application responsive to detecting the second change in orientation, to resume providing the first graphic output of the browser application on the display responsive to detecting the second change in orientation, to detect a third change in orientation of the electronic device after resuming providing the first graphic output of the browser application, and to resume providing the second graphic output of the video application on the display beginning where the second graphic output was pause responsive to detecting the third change in orientation.

16. The electronic device according to claim 9 wherein the browser application is configured to provide Internet browsing.

* * * * *